United States Patent
Kim et al.

(10) Patent No.: US 11,338,364 B2
(45) Date of Patent: May 24, 2022

(54) ALUMINUM POWDER COATED WITH FLUORINE-BASED HYDROCARBON POLYMER LAYER AND PREPARATION METHOD THEREFOR

(71) Applicant: KOREA INSTITUTE OF MACHINERY & MATERIALS, Daejeon (KR)

(72) Inventors: Kyung Tae Kim, Busan (KR); Ji Hun Yu, Busan (KR); Dongwon Kim, Busan (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 49 days.

(21) Appl. No.: 16/342,013

(22) PCT Filed: Oct. 13, 2017

(86) PCT No.: PCT/KR2017/011333
§ 371 (c)(1),
(2) Date: Apr. 15, 2019

(87) PCT Pub. No.: WO2018/070838
PCT Pub. Date: Apr. 19, 2018

(65) Prior Publication Data
US 2019/0247919 A1    Aug. 15, 2019

(30) Foreign Application Priority Data
Oct. 14, 2016    (KR) .................. 10-2016-0133712

(51) Int. Cl.
*B22F 1/00*    (2022.01)
*B22F 9/24*    (2006.01)
(Continued)

(52) U.S. Cl.
CPC ............... *B22F 1/102* (2022.01); *B22F 1/16* (2022.01); *B22F 9/24* (2013.01); *B23K 35/02* (2013.01);
(Continued)

(58) Field of Classification Search
None
See application file for complete search history.

(56) References Cited

U.S. PATENT DOCUMENTS 5,936,009 A * 8/1999 Harrison ................ B05D 5/083
                                                 523/215
6,843,868 B1    1/2005 Fawls et al.
(Continued)

FOREIGN PATENT DOCUMENTS

CN    104629089    *    5/2015
KR    10-1991-0001900    3/1991
(Continued)

OTHER PUBLICATIONS

Lezzi (polyvinylidene Fluoride-Based Coatings Technology) (Year: 2015).*
(Continued)

*Primary Examiner* — Ronak C Patel
(74) *Attorney, Agent, or Firm* — Lex IP Meister, PLLC (57) ABSTRACT

The present invention relates to an aluminum powder coated with a fluorine-based hydrocarbon polymer layer, and a preparation method therefor. According to the present invention, the aluminum powder coated with a fluorine-based hydrocarbon polymer layer and a preparation method therefor enable the preparation of an aluminum powder coated with a fluorine-based hydrocarbon polymer layer, in which an additional oxidation reaction of the aluminum powder is
(Continued)

achieved and fuel performance as a solid fuel is improved, by coating the fluorine-based hydrocarbon polymer layer on the surface of the powder.

18 Claims, 9 Drawing Sheets

(51) Int. Cl.
*B22F 1/102* (2022.01)
*B33Y 70/00* (2020.01)
*C10L 5/02* (2006.01)
*B23K 35/28* (2006.01)
*C10L 1/12* (2006.01)
*B23K 35/02* (2006.01)
*B22F 1/16* (2022.01)
*B22F 1/142* (2022.01)
*B22F 1/145* (2022.01)

(52) U.S. Cl.
CPC .............. *B23K 35/28* (2013.01); *B33Y 70/00* (2014.12); *C10L 1/12* (2013.01); *C10L 5/02* (2013.01); *B22F 1/142* (2022.01); *B22F 1/145* (2022.01); *B22F 2301/052* (2013.01); *B22F 2304/10* (2013.01); *B23K 35/286* (2013.01)

(56) References Cited

U.S. PATENT DOCUMENTS

| | | | |
|---|---|---|---|
| 2009/0090440 A1 | 4/2009 | Kellett | |
| 2010/0080903 A1* | 4/2010 | Tamitsuji | B05D 1/60 427/255.11 |
| 2013/0011660 A1* | 1/2013 | Diekmann | C04B 35/6264 428/323 |
| 2014/0107280 A1* | 4/2014 | Luo | C09J 4/06 524/533 |

FOREIGN PATENT DOCUMENTS

| | | |
|---|---|---|
| KR | 10-2002-0074424 | 9/2002 |
| KR | 10-0454658 | 8/2005 |
| KR | 10-2014-0146901 | 12/2014 |

OTHER PUBLICATIONS

DeLisio et al. (Ignition and Reaction Analysis of High Loading Nano-Al/Fluoropolymer Energetic Composite Films). (Year: 2014).*

Sanghyup Lee et al., "Fabrication and Thermophysical Properties of Nickel-coated Aluminum Powder by Electroless Plating", Journal of the Korean Society of Propulsion Engineers, vol. 18, No. 4, pp. 9-17, 2014.

* cited by examiner

| Powder | Snapshot | | | | | Total combustion time |
|---|---|---|---|---|---|---|
| Comparative example 1 Al powder | 0 ms | 1.6 ms | 3.4 ms | 6 ms | 8.5 ms | 6.6 ms |
| Example 1 PVDF/Al powder | 0 ms | 1.6 ms | 3.4 ms | 6.1 ms | 8.5 ms | 26.6 ms | ered with nickel. Particularly, the core of aluminum powder is coated with nickel, which can be used as a mixed material of explosive materials due to the exothermic reaction between the two metals. The powder coated with nickel on the aluminum core is used as an additive to the explosive device and is prepared by mixing and dispersing in an explosive material. The aluminum powder coated with nickel on the core can be used as an additive for an explosive device and can be mixed with or dispersed in an explosive material. When temperature of the powder in the explosive material rises higher than the alloy temperature of the two metals, alloy reaction proceeds throughout the powder and exhibits a high exothermic reaction. However, the oxide layer on the aluminum powder in the previous inventions is functioning to interrupt the alloy reaction between aluminum and nickel, so that a complicated production process to eliminate the oxide layer above is required and the elimination of the oxide layer is not even perfect.

ALUMINUM POWDER COATED WITH FLUORINE-BASED HYDROCARBON POLYMER LAYER AND PREPARATION METHOD THEREFOR

BACKGROUND OF THE INVENTION

1. Field of the Invention

The present invention relates to an aluminum powder coated with a fluorine-based hydrocarbon polymer layer, and a preparation method therefor.

2. Description of the Related Art

Aluminum is an energetic metal that shows a high exothermic reaction due to a violent oxidation reaction when reacting with oxygen. Due to the high reactivity, aluminum is used as a core material of a solid propellant of a rocket, and has been applied widely to an underwater bonding material and a defense industry material, etc.

In the meantime, aluminum in the form of powder is naturally oxidized and aluminum oxide is formed on the surface of the aluminum. Therefore, in order to induce the reaction with oxygen, the oxide film has to be removed first.

When the oxide film on the surface of aluminum powder is removed, the reactivity of aluminum powder can be ensured. However, such an energetic reaction on the surface of aluminum causes a safety problem in handling. Thus, studies have been undergoing to prevent an additional oxidation reaction in aluminum itself while maintaining the reactivity of aluminum powder by coating the surface of aluminum with an organic or inorganic substance.

U.S. Pat. No. 6,843,868 describes a method to improve combustion performance of aluminum powder by coating the aluminum powder with various organic substances. Particularly, the surface of aluminum nanoparticles was coated with poly-fluoro-benzene and Teflon to increase the combustion reactivity of the powder. However, the coating above was performed without removing the oxide film on the surface of aluminum and as a result the additional growth of the oxide film was able to be inhibited but another step of removing the aluminum oxide remaining on the surface of aluminum after the combustion of the organic substance was necessary in order to induce combustion reaction thereafter.

US Patent No. US2009-0090440 A1 describes a method to prepare aluminum powder by coating the aluminum core with nickel. Particularly, the core of aluminum powder is coated with nickel, which can be used as a mixed material of explosive materials due to the exothermic reaction between the two metals. The powder coated with nickel on the aluminum core is used as an additive to the explosive device and is prepared by mixing and dispersing in an explosive material. The aluminum powder coated with nickel on the core can be used as an additive for an explosive device and can be mixed with or dispersed in an explosive material. When temperature of the powder in the explosive material rises higher than the alloy temperature of the two metals, alloy reaction proceeds throughout the powder and exhibits a high exothermic reaction. However, the oxide layer on the aluminum powder in the previous inventions is functioning to interrupt the alloy reaction between aluminum and nickel, so that a complicated production process to eliminate the oxide layer above is required and the elimination of the oxide layer is not even perfect.

Thus, the present inventors have studied about the formation of an organic or inorganic coating layer in order to improve the stability and reactivity of aluminum. In the course of the study, the present inventors confirmed that when aluminum powder was coated with a fluorine-based hydrocarbon polymer layer, the rapid oxidation reactivity was accelerated in aluminum and at the same time the combustion reaction was efficiently induced, leading to the completion of the present invention.

PRIOR ART REFERENCE

Patent Reference (Patent Reference 1) U.S. Pat. No. 6,843,868
(Patent Reference 2) US Patent No. US2009-0090440 A1

SUMMARY OF THE INVENTION

It is an object of the present invention to provide an aluminum powder coated with a fluorine-based hydrocarbon polymer layer and a preparation method of the same.

To achieve the above object, the present invention provides an aluminum powder coated with a fluorine-based hydrocarbon polymer layer comprising an aluminum core; and a fluorine-based hydrocarbon polymer layer formed on the aluminum core, in which the aluminum core contacts to the fluorine-based hydrocarbon polymer layer directly and one or more materials selected from the group consisting of aluminum oxide, aluminum hydroxide and aluminum fluoride are included at least partially between the aluminum core and the fluorine-based hydrocarbon polymer layer.

The present invention also provides a powder material comprising the aluminum powder coated with the fluorine-based hydrocarbon polymer layer for the production of an underwater bonding material, a reactive material for welding, a diesel engine reactivity enhancing additive, a solid fuel and a three-dimensional structure.

In addition, the present invention provides a preparation method of the aluminum powder coated with a fluorine-based hydrocarbon polymer layer, comprising the following steps:

eliminating the oxide film on the surface of the aluminum powder by a liquid-phase process (step 1);

introducing a fluorine-based hydrocarbon polymer solution into the solution finished with step 1 above (step 2); and recovering the aluminum powder coated with the fluorine-based hydrocarbon polymer layer on its surface (step 3).

Advantageous Effect

The aluminum powder coated with a fluorine-based hydrocarbon polymer layer of the present invention and the preparation method of the same enable the preparation of an aluminum powder coated with a fluorine-based hydrocarbon polymer layer, in which an additional oxidation reaction of the aluminum powder is achieved and fuel performance as a solid fuel is improved, by coating the fluorine-based hydrocarbon polymer layer on the surface of the powder.

DESCRIPTION OF THE PREFERRED EMBODIMENTS

The present invention provides an aluminum powder coated with a fluorine-based hydrocarbon polymer layer comprising an aluminum core; and a fluorine-based hydrocarbon polymer layer formed on the aluminum core, in which the aluminum core contacts to the fluorine-based hydrocarbon polymer layer directly and one or more materials selected from the group consisting of aluminum oxide, aluminum hydroxide and aluminum fluoride are included at least partially between the aluminum core and the fluorine-based hydrocarbon polymer layer.

Figure 1:
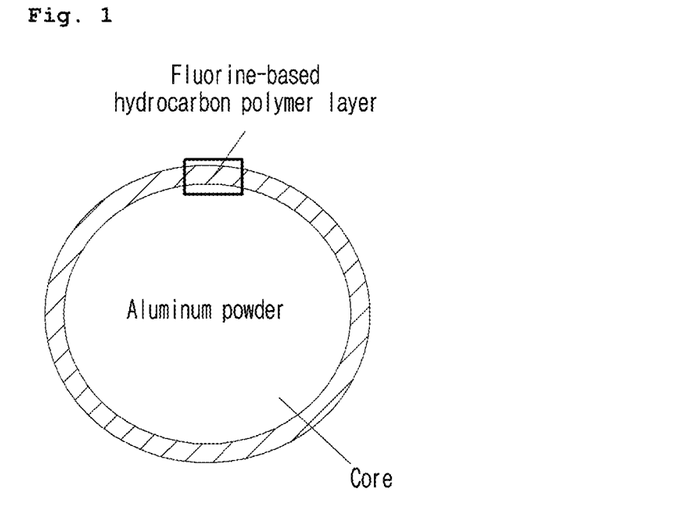
FIGS. 1 and 2 are schematic diagrams illustrating the aluminum powder coated with a fluorine-based hydrocarbon polymer layer.
Figure 2:
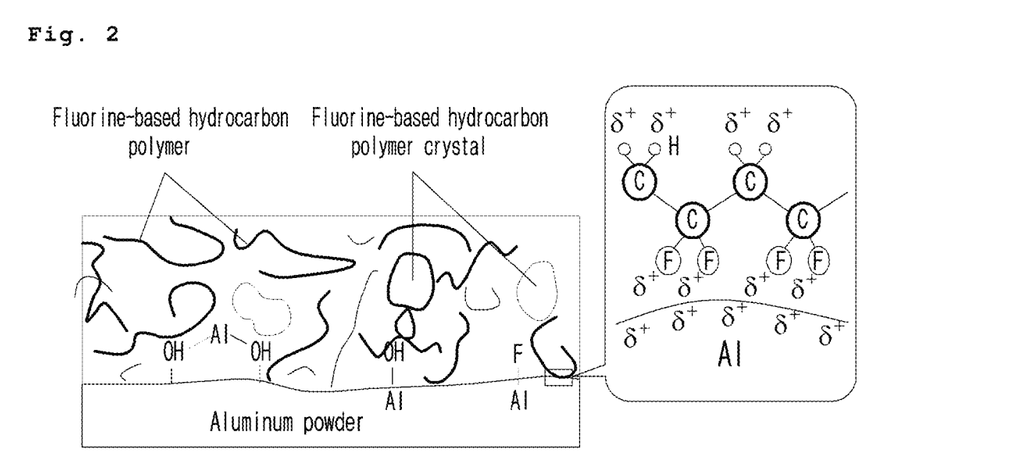

FIGS. 1 and 2 are schematic diagrams illustrating the aluminum powder coated with a fluorine-based hydrocarbon polymer layer, provided by the present invention. Particularly, FIG. 1 is a schematic diagram of the aluminum powder coated with a fluorine-based hydrocarbon polymer layer and FIG. 2 is another schematic diagram illustrating the enlargement of the coating layer of the powder of FIG. 1, in which the surface of aluminum is combined with the fluorine-based hydrocarbon polymer layer.

The purpose of the present invention is to eliminate the aluminum oxide layer from the surface of aluminum core and to form a fluorine-based hydrocarbon polymer on the aluminum core instead. However, considering the characteristics of aluminum, it is difficult to eliminate the oxide layer completely from the surface of aluminum powder and even if the oxide layer is eliminated, the pure aluminum can easily form another oxide layer on its surface by reacting with a small amount of oxygen. Once the oxide layer is formed on the surface of aluminum core, the fluorine-based hydrocarbon polymer layer cannot be easily formed.

According to the prior art, a fluorine-based hydrocarbon polymer layer is coated on the oxide layer on the surface of aluminum without eliminating the oxide layer or removal of the aluminum oxide layer and coating of the organic and inorganic layers are performed in a separate process. So, a thick aluminum oxide layer is formed between the aluminum core and the organic and inorganic layers formed on the aluminum core. The aluminum oxide layer covering the aluminum core reduces the combustion reactivity of aluminum.

On the other hand, the aluminum powder coated with the fluorine-based hydrocarbon polymer layer provided by the present invention does not have the aluminum oxide layer on the boundary between the aluminum and the fluorine-based hydrocarbon polymer layer or if includes, the oxide layer exists only at a minimum amount, since the oxide layer is eliminated from the aluminum powder and at the same time a fluorine-based hydrocarbon polymer layer is formed on the aluminum core directly. Therefore, the fluorine-based hydrocarbon polymer layer can contact with the aluminum easily without any interruption of the aluminum oxide layer, suggesting that the aluminum powder of the present invention demonstrates a higher exothermic reaction and can release more energy than the conventional aluminum powder.

At this time, the oxide layer can be eliminated by a liquid phase process and re-oxidized in a solution. In the course of coating the aluminum surface with a fluorine-based hydrocarbon polymer layer, the aluminum powder can include one or more materials selected from the group consisting of aluminum oxide, aluminum hydroxide and aluminum fluoride at least partially between the aluminum core and the fluorine-based hydrocarbon polymer layer.

At this time, the preferable diameter of the aluminum core of aluminum powder is 1 μm~10 μm.

In the aluminum powder coated with the fluorine-based hydrocarbon polymer layer according to the present invention, if the size of the aluminum powder is more than 10 μm, the oxide film formed thereby would become very thick so that the higher ignition temperature is required, compared with the smaller sized powder, and incomplete combustion can be an issue. On the other hand, if the size of the aluminum powder is less than 1 μm (nanoparticle), the reactivity would be faster but the volume of the oxide film formed on the surface would be relatively bigger than that of the aluminum powder in micro size, indicating that the amount of energy generated by the oxidation reaction would be reduced. So, the aluminum powder in the size of between 1 μm and 10 μm can secure excellent reaction characteristics of nanoparticle and excellent energy release of tens of micro-sized powder at the same time.

Preferably, the thickness of the fluorine-based hydrocarbon polymer layer is 10 nm~500 nm, but not always limited thereto.

In the aluminum powder coated with the fluorine-based hydrocarbon polymer layer according to the present invention, the fluorine-based hydrocarbon polymer layer is coated to prevent further oxidation of the aluminum core, to prevent deterioration of the aluminum powder at a temperature of 100° C. or less and to provide a high exothermic reaction at a high temperature when it is used as a solid fuel or the like.

In the aluminum powder of the present invention, the coating layer formed instead of the oxide film is removed at a low temperature in a short time. So that the aluminum powder of the present invention is more advantageous to overcome the problem of incomplete combustion of the conventional aluminum powder having an oxide film. If the thickness of the fluorine-based hydrocarbon polymer layer is more than 500 nm, the amount of the aluminum core can be reduced and accordingly the combustion performance is deteriorated. In the meantime, if the thickness of the fluorine-based hydrocarbon polymer layer is less than 10 nm, the diffusion of the external oxygen cannot be sufficiently prevented so that the reoxidation of the aluminum core can be induced in the atmosphere. However, the thickness limitation of 10 nm to 500 nm is suitable for the aluminum core having a size of several micrometers. If the size of the aluminum core is increased or decreased, the thickness is not limited thereto.

At this time, a polymer forming the fluorine-based hydrocarbon polymer layer is preferably polyvinylidene fluoride (PVDF).

In the aluminum powder coated with the fluorine-based hydrocarbon polymer layer according to the present invention, various materials were coated to evaluate the characteristics of the polymer layer. General hydrocarbon based organic materials are easy to coat with a simple process, but the strength of the coating layer and the heat resistance thereof are too weak to prevent reoxidation of the aluminum powder with external oxygen. In the case of Teflon composed of carbon (C) and fluorine (F), it is possible to bind firmly by chemical reaction between aluminum (Al) and fluorine (F). So it can be importantly used for the prevention of oxidation by oxygen (O) on the surface of the aluminum powder. However, Teflon is less easily removed than hydrocarbon, and it is difficult to induce reaction at a low temperature. Since the chain structure of polyvinylidene fluoride is suitably constituted of hydrocarbon and fluorine atoms, the advantages of hydrocarbon and fluorine-based organic materials can be simultaneously exhibited. Therefore, polyvinylidene fluoride is a preferred material in this invention to achieve the object of the present invention, which is capable of effectively preventing the reoxidation of aluminum and producing an aluminum powder in which thermal, chemical, and mechanical properties are appropriately controlled.

The present invention also an underwater bonding material or a highly reactive material for welding comprising the aluminum powder coated with the fluorine-based hydrocarbon polymer layer according to the present invention.

The metal particles with a high heating value can generate heat energy stably and constantly by combustion reaction if only proper oxygen necessary for combustion is supplied. Therefore, the aluminum powder coated with the fluorine-based hydrocarbon polymer layer that can produce heat energy enough for as long time as necessary for preparing a metal structure in river or sea can be very advantageous as an underwater bonding material and a highly reactive material for welding. In addition, the surface of the aluminum powder coated with the fluorine-based hydrocarbon polymer layer has hydrophobic properties, so that it is also advantageous in preventing direct reaction of the aluminum core with water in the case of being used as an underwater bonding material.

The present invention also provides an additive for improving reactivity of a diesel engine comprising the aluminum powder coated with the fluorine-based hydrocarbon polymer layer according to the present invention.

A diesel engine has an excellent performance but has problems of discharging various pollutants, exhaust and unburned hydrocarbons. To overcome the problems above, such attempts as engine modification alternative fuel development or introduction of exhaust gas treatment equipment have been tried. The aluminum powder of the present invention can be used as a fuel additive with capability of inducing high exothermic reaction as mixed in a liquid fuel, can improve the performance of a diesel engine with high combustion efficiency and can reduce pollutants discharged.

In addition, the present invention provides a solid fuel comprising the aluminum powder coated with the fluorine-based hydrocarbon polymer layer according to the present invention.

Solid fuel is characterized by having a much higher energy density than liquid fuel, so that it has been used as fuel for a spacecraft launcher, in the area where instant reaction heat is required, and as an alternative material replacing explosives in automobile airbags. The aluminum powder coated with the fluorine-based hydrocarbon polymer layer of the preset invention emits about 20 to 40% more energy than pure aluminum at the temperature range of 750° C. to 1200° C. The aluminum powder of the present invention exhibits a faster oxidation behavior than the conventional aluminum solid fuel and can be burned efficiently, so that it can be used as an excellent alternative material in the fields mentioned above.

Further, the present invention provides a powder material for the production of a three-dimensional structure coated with the fluorine-based hydrocarbon polymer layer according to the present invention.

To prepare a three-dimensional structure, aluminum alloys having various compositions have been used. Among metals, aluminum has a relatively high reflectivity. So, it requires as high laser power as at least 100 W. Therefore, a three-dimensional molding printer having high power is required. The surface of the powder material coated with the fluorine-based hydrocarbon polymer layer according to the present invention displays a low reflectivity, compared with the pure aluminum material and a fast heat absorption, which favors the production of a three-dimensional structure with a low laser power. So, molding can be possible at 100 W or less, which cannot be achieved with some metal 3D printers.

In addition, the present invention provides a preparation method of the aluminum powder coated with a fluorine-based hydrocarbon polymer layer, comprising the following steps:

eliminating the oxide film on the surface of the aluminum powder by a liquid-phase process (step 1)

introducing a fluorine-based hydrocarbon polymer solution into the solution finished with step 1 above (step 2); and recovering the aluminum powder coated with the fluorine-based hydrocarbon polymer layer on its surface (step 3).

Hereinafter, the preparation method of the aluminum powder coated with a fluorine-based hydrocarbon polymer layer is described in more detail, step by step with attached Figures.

Figure 3:
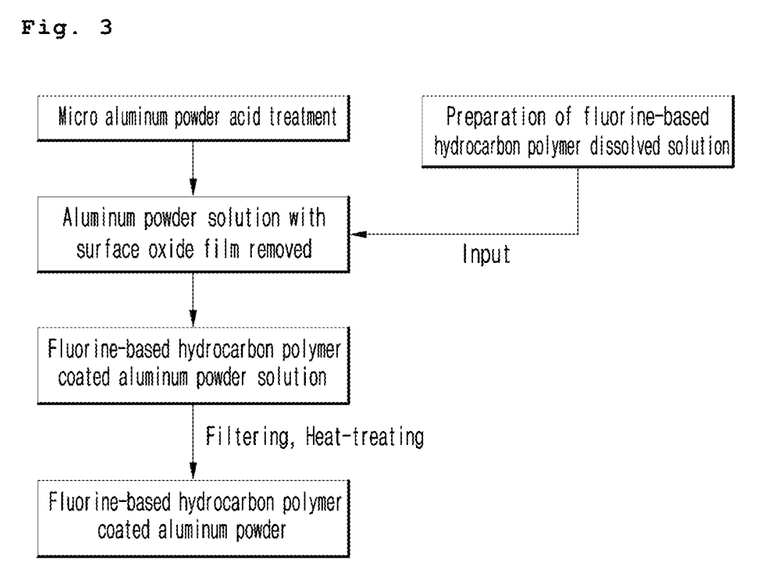
FIG. 3 is a flow chart illustrating the preparation method of the aluminum powder coated with a fluorine-based hydrocarbon polymer layer.
Figure 4:
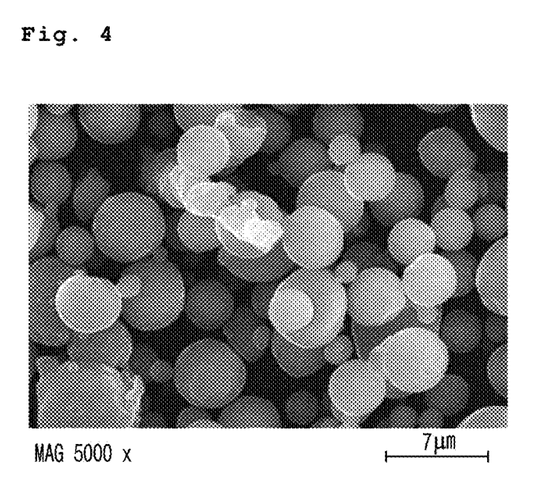
FIG. 4 is a photograph illustrating the pure aluminum powder observed by scanning electron microscope (SEM).
Figure 5:
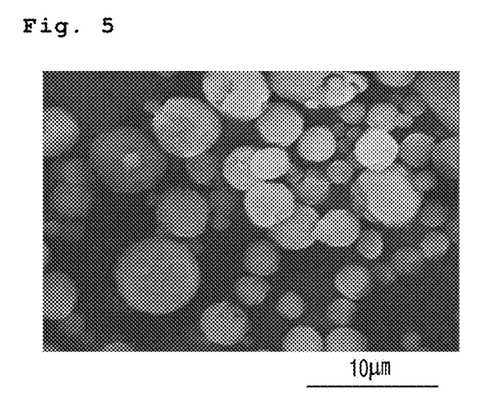
FIG. 5 is a photograph illustrating the aluminum powder coated with the fluorine-based hydrocarbon polymer layer according to the present invention, observed by scanning electron microscope.

FIG. 3 is a flow chart illustrating the preparation method of the aluminum powder coated with a fluorine-based hydrocarbon polymer layer according to the present invention. Unlike the conventional preparation method, the preparation method of the present invention introduced a solution in which a fluorine-based hydrocarbon polymer was dissolved therein into a liquid solution of aluminum powder from which an oxide film had been eliminated, in order to induce coating with the fluorine-based hydrocarbon polymer layer and to eliminate the aluminum oxide layer simultaneously.

In general, in the conventional preparation method, the elimination of an oxide layer and the coating of an organic layer were separately performed. However, in this invention, the elimination of an oxide layer and the coating of an organic layer were performed in a continuous process in one container, which simplified the process and lowered the manufacturing cost.

Step 1 of the preparation method of the present invention is a step to eliminate the oxide film on the surface of the aluminum powder. In this step, the oxide film formed on the surface of aluminum is eliminated before the process of coating with a fluorine-based hydrocarbon polymer layer in order to prevent oxidation in the following process.

At this time, the particle diameter of the aluminum powder in step 1 is preferably 1 to 10 μm.

If the size of the aluminum powder is more than 10 μm, the oxide film formed thereon would be thick, suggesting that the combustion efficiency is lower than that of the powder having a smaller size. On the other hand, if the size of the aluminum powder is less than 1 μm, the reactivity would be faster but the volume of the oxide film formed on the surface would be relatively bigger than that of the aluminum powder in micro size, indicating that the amount of energy generated by the oxidation reaction would be reduced. So, the aluminum powder in the size of between 1 μm and 10 μm can secure excellent reaction characteristics of nanoparticle and excellent energy release of tens of micro-sized powder at the same time.

The solution used in the liquid phase process of step 1 is preferably one or more solutions selected from the group consisting of a hydrofluoric acid solution, a nitric acid solution, a sulfuric acid solution, a citric acid solution, a maleic acid solution, an acetic acid solution, basic sodium hydroxide, basic potassium hydroxide and an aqueous ammonia solution.

The solutions above are acidic solutions, which can eliminate the oxide layer efficiently from the surface of the aluminum powder. In addition to the acidic solutions above, basic sodium hydroxide (NaOH), basic potassium hydroxide (KOH) and an aqueous ammonia (NH$_4$OH) solution can also be used in order to eliminate the oxide layer. Among these solutions, acidic hydrofluoric acid is more preferably used, which is because the oxide layer is evenly dissolved and eliminated by hydrofluoric acid. On the other hand, if a basic solution is used, the oxide film is removed irregularly. Acid solutions in addition to the acid solutions above can also be used but if an organic acid solution exhibiting a weak acidity is used, the amount of ionized hydrogen ions provided would be smaller by the total weight, so that the oxide film elimination efficiency is very low. Therefore, it is preferred to select one or more solutions from the group consisting of a hydrofluoric acid solution, a nitric acid solution, a sulfuric acid solution, a citric acid solution, a maleic acid solution and an acetic acid solution, because these solutions are efficient economically and easy to control their pHs Step 2 of the preparation method of the present invention is a step to introduce a fluorine-based hydrocarbon polymer solution into the solution finished with step 1 above. In this step, an anti-oxidation coating layer is formed to prevent the oxide film from being formed again after removing the oxide film from the surface of aluminum powder in step 1.

At this time, the solvent used in the fluorine-based hydrocarbon polymer solution of step 2 is preferably a solvent that can inhibit the oxidation of aluminum powder.

In the preparation method of the aluminum powder coated with the fluorine-based hydrocarbon polymer layer according to the present invention, if the solvent used in step 2 could not inhibit the oxidation of aluminum powder, an oxide layer would be formed again on the surface of aluminum powder and at last an aluminum oxide layer would be formed between the aluminum powder and the fluorine-based hydrocarbon polymer, resulting in the decrease of the performance of aluminum powder.

The solvent used in the fluorine-based hydrocarbon polymer solution of step 2 is preferably one or more solvents selected from the group consisting of N,N-dimethylforanamide (DMF, C3H7NO), dimethyl sulfoxide (DMSO) and tetrahydrofuran (THF).

The solvent above is preferably such a solvent that has a chemical structure displaying a polarity due to the formation of a dipole moment by the asymmetry of the electronic structure or an aqueous solution containing a part thereof. In the solution, ionization does not occur or extremely little occurs in the aqueous solution. So, it is hard to expect the direct ion-exchange reaction with the solution used for removing the aluminum oxide film. Therefore, the solvent having PVDF dissolved therein is going to react to the aluminum surface entirely. If the solvent containing PVDF dissolved therein and the acid solution for removing the oxide film react with each other, the oxide film removing process and the coating process are duplicated respectively, indicating each process is hard to control.

In the preparation method of the aluminum powder coated with the fluorine-based hydrocarbon polymer layer according to the present invention, the solvents capable of dissolving PVDF such as N,N-dimethylforanamide (DMF) and DMSO have the effect of preventing further reoxidation of the aluminum powder. That is, DMF solution does not directly induce oxidation of aluminum through oxygen ion exchange as shown in other hydrocarbon based solvents. Since DMF and DMSO solutions do not generate hydrogen ions, the loss of aluminum can be prevented in the state where the oxide film is removed as shown in formula (1). That is, as shown in formula (2), they play a role in preventing further oxidation through the fluorination of some area of the aluminum surface.

$$Al(s)+exceed\ 3H^+(aq) \rightarrow Al^{3+}(aq)+3/2H_2(g)\uparrow \qquad \text{Formula (1)}$$

$$Al^{3+}(aq)+3F^-(aq) \rightarrow AlF_3(aq) \qquad \text{Formula (2)}$$

At this time, the fluorine-based hydrocarbon polymer of step 2 is preferably polyvinylidene fluoride (PVDF).

That is, in the aluminum powder coated with the fluorine-based hydrocarbon polymer layer according to the present invention, Al—F reaction is induced between the PVDF layer and the aluminum surface as shown in FIG. 1(b) to prevent reoxidation by Al—OH reaction.

Step 3 of the preparation method of the present invention is a step to recover the aluminum powder coated with the fluorine-based hydrocarbon polymer layer on its surface in step 2. In this step, a process of drying the solvent and a process of filtering the powder with a mesh to obtain even sized particles can be performed.

In addition, step 3 can additionally include a step of heat-treating before recovering the aluminum powder coated with the fluorine-based hydrocarbon polymer layer.

In the preparation method of the aluminum powder coated with the fluorine-based hydrocarbon polymer layer according to the present invention, the solvents present in the fluorine-based hydrocarbon polymer layer are evaporated through the heat treatment, and the fluorine-based hydrocarbon polymer coating layer, which has been somewhat loosely formed in the aqueous solution, is changed into a dense structure through the heat treatment. Preferably, the heat treatment is performed at 50° C. or less considering the volatilization of DMSO. Through this, the dense fluorine-based hydrocarbon polymer coating layer prevents the reoxidation of aluminum and has a thermal stability at less than 100° C.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1: Preparation of Aluminum Powder Coated with PVDF Layer

Aluminum Powder in the average diameter of 5 μm was prepared. 1.0 g of the prepared aluminum powder was added to an aqueous solution containing 1.0 to 5.0 weight % of hydrofluoric acid to remove aluminum oxide present on the surface of the aluminum powder.

Another liquid phase was prepared by dissolving 0.2 g of PVDF in an aqueous solution containing 60 weight % of DMSO. The solution containing PVDF dissolved therein was introduced into the acid aqueous solution above, followed by reaction to form PVDF layer on the surface of aluminum.

Heat treatment was performed before the aluminum powder coated with PVDF was recovered. The heat-treated powder was recovered by filtering. As a result, an aluminum powder wherein PVDF layer in the thickness of 0.1 μm was formed in the aluminum core in the size of 5 μm was prepared.

The prepared aluminum coated with PVDF is shown in FIG. 2. As shown in FIG. 2, AL-F reaction was generated between the PVDF layer and the aluminum surface to prevent reoxidation by external oxygen.

Comparative Example 1

Aluminum powder in the average diameter of 5 μm which was the same as that used in Example 1 was prepared. The aluminum powder has an aluminum oxide layer in the thickness of about 5 nm to 6 nm on its surface in the natural state.

Experimental Example 1: Transmission Electron Microscopy Analysis

Figure 6:
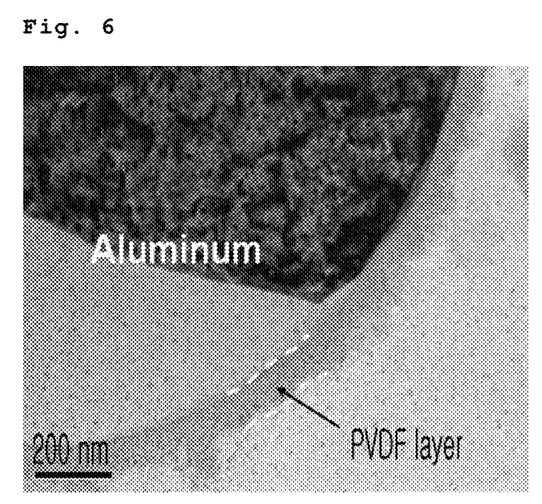
FIG. 6 is a photograph illustrating the aluminum powder coated with the fluorine-based hydrocarbon polymer layer according to the present invention, observed by transmission electron microscope (TEM).

Transmission electron microscopy (JEOL, JEM-2100F) analysis was performed with the aluminum powder prepared in Example 1 in order to confirm the surface of the aluminum powder coated with the fluorine-based hydrocarbon polymer layer according to the present invention. The results are shown in FIG. 6. As shown in FIG. 6, it was confirmed that a heterogeneous morphology layer in the average thickness of approximately 100 nm was formed unevenly on the surface of the aluminum powder.

Experimental Example 2: Elemental Mapping

Figure 7:
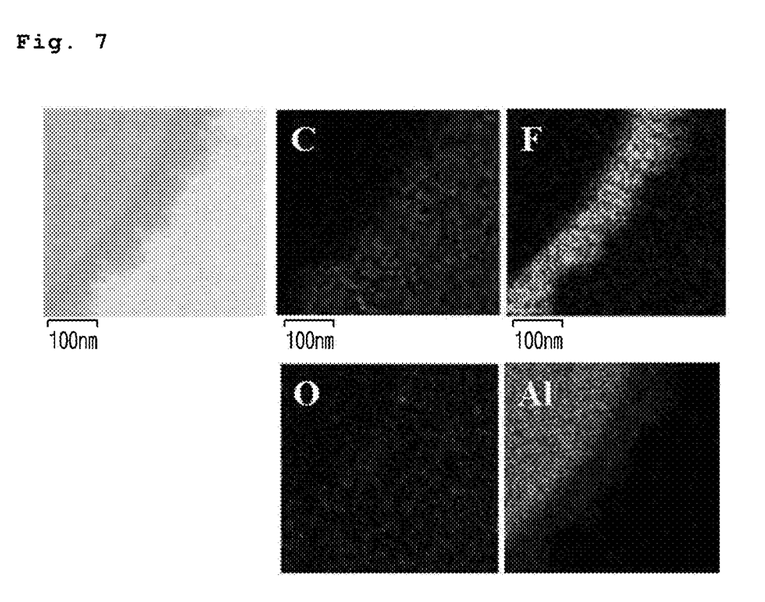
FIG. 7 is a set of photographs illustrating the aluminum powder coated with the fluorine-based hydrocarbon polymer layer according to the present invention, observed by elemental mapping.

Elemental mapping was performed with the aluminum powder coated with the fluorine-based hydrocarbon polymer layer prepared in Example 1 according to the present invention in order to investigate the heterogeneous morphology layer on the aluminum powder surface confirmed in Experimental Example 1 using EDS (Energy Dispersive X-ray Spectroscopy) attached to TEM (JEOL, JEM-2100F). The results are shown in FIG. 7. As shown in FIG. 7, it was confirmed that a large amount of carbon (C) and fluorine (F) existed in the heterogeneous layer. In particular, fluorine (F) was concentrated in the heterogenous layer, indicating that the layer formed on the aluminum core was made of PVDF. The results above are presented in the schematic diagram of FIG. 2. As shown in FIG. 2, Al—F was primarily formed on the surface of Al powder overall and some Al—OH bonds were formed in the interface structure. The chemical binding energy of Al—F is relatively stable compared to the binding energy of Al—O, so it is expected that additional reoxidation of the Al surface can be prevented.

Experimental Example 3: Fourier Transform Infrared Spectroscopy

Figure 8:
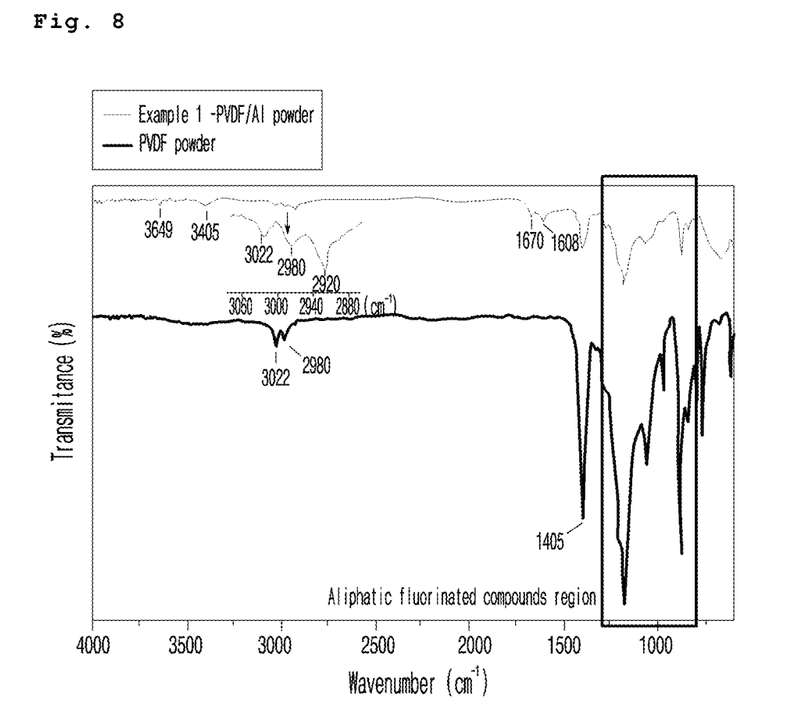
FIG. 8 is a graph illustrating the results of Fourier Transform InfraRed (FT-IR) spectroscopy with the aluminum powder prepared in Example 1 of the present invention and PVDF (polyvinylidene fluoride) powder.

To investigate the coating layer on the surface of aluminum confirmed in Experimental Example 1, Fourier transform infrared spectroscopy (FTIR-ATR, Thermo Scientific, Nicolet iS5) was performed with the aluminum powder prepared in Example 1 and PVDF powder. The results are shown in FIG. 8. As shown in FIG. 8, the PVDF representative spectral peak 3022, 2980 cm$^{-1}$ detected in PVDF powder was also detected in the sample of Example 1. From the result above, it was confirmed that the PVDF layer was successfully coated on the aluminum powder prepared according to the present invention. The peaks at between 800 and 1300 cm$^{-1}$ were matched with the fluorinated compound, suggesting that the fluorinated compound mainly based on F remained on the AL surface and formed a chemical bond thereon.

Experimental Example 4: Thermogravimetric Analysis

To perform the thermal analysis with the aluminum powder each prepared in Example 1 and in Comparative Example 1 according to the present invention, the samples were loaded in a thermogravimetric analyzer (TGA-DSC, TA Instruments, Model No. Q600), followed by raising temperature up to 1200° C. by 5° C./min. While raising the temperature, the relative weight changes were observed and the results are shown in FIG. 9.

Figure 9:
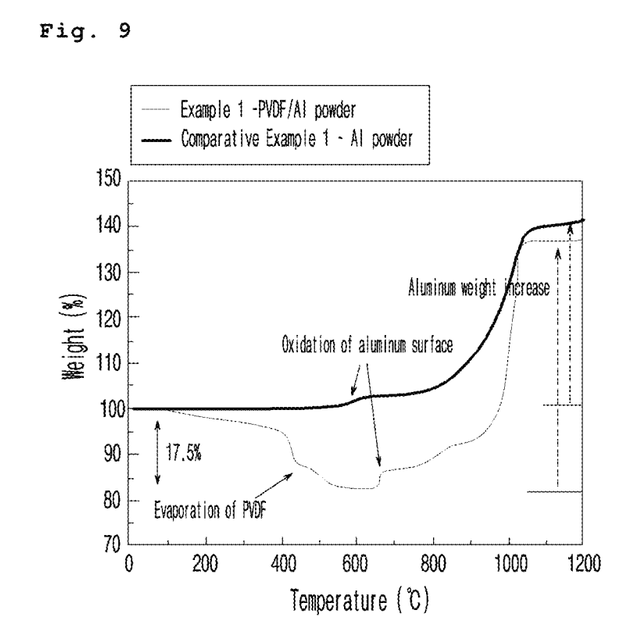
FIG. 9 is a graph illustrating the results of thermogravimetric analysis spectroscopy with the aluminum powders prepared in Example 1 and in Comparative Example 1 of the present invention.

As shown in FIG. 9, the PVDF layer on the aluminum powder containing an aluminum oxide layer began to be removed at the temperature up to 100° C. and was all eliminated at the temperature around 600° C., but reoxidation followed. At this time, the weight was increased, which was significant compared with the results of Comparative Example 1. That is, more oxidation reaction was induced in the aluminum powder coated with PVDF than in pure aluminum powder. It was also confirmed that the stability of the aluminum powder of the present invention was secured at the temperature up to 100° C. when PVDF was used.

Experimental Example 5: Differential Scanning Calorimetry

Figure 10:
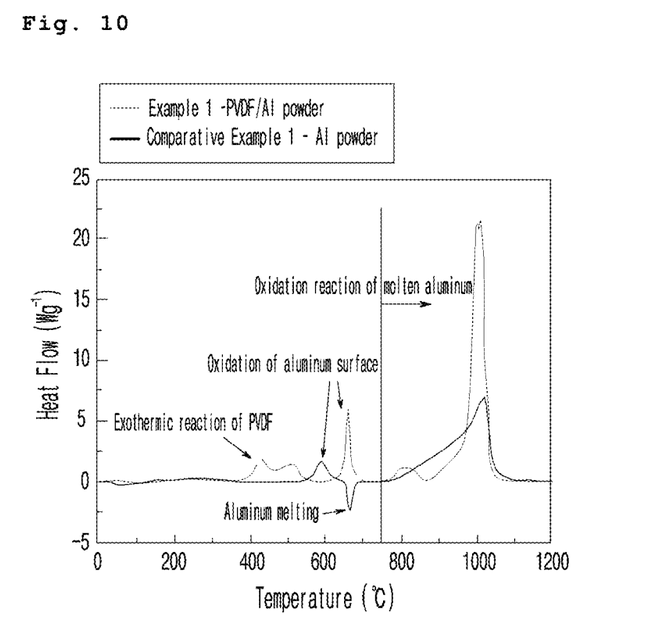
FIG. 10 is a graph illustrating the results of differential scanning calorimetry with the aluminum powders prepared in Example 1 and in Comparative Example 1 of the present invention.

To perform the thermal analysis with the aluminum powder each prepared in Example 1 and in Comparative Example 1 according to the present invention, the samples were loaded in a differential scanning calorimeter (TGA-DSC, TA Instruments, Model No. Q600), followed by raising temperature up to 1200° C. by 5° C./min. While raising the temperature, the heat flow at each temperature was observed and the results are shown in FIG. 10.

In the case of the aluminum powder prepared in Example 1, an exothermic reaction was confirmed at the temperature around 400° C., indicating that the exothermic reaction was related to the elimination reaction of hydrocarbon or fluorine of PVDF. As the Al layer which had been protected by PVDF was exposed by PVDF removal, a strong oxidation reaction was observed at the temperature of 1000° C. This exothermic reaction was relatively stronger than that of the pure aluminum powder still containing an oxide film. As shown in FIG. 10, it was confirmed that the aluminum powder of the present invention started to react at a relatively low temperature and generated relatively more heat during the exothermic reaction.

Experimental Example 6: Combustion Test

Figure 12:
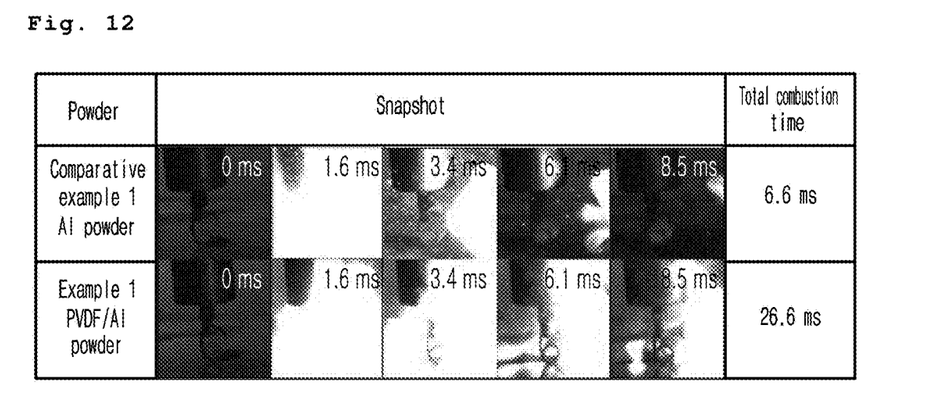
FIG. 12 is a set of photographs illustrating the results of combustion test with the aluminum powders prepared in Example 1 and in Comparative Example 1 of the present invention.

Combustion test was performed with the aluminum powder each prepared in Example 1 and in Comparative Example 1 according to the present invention and the results are shown in FIG. 12.

As shown in FIG. 12, the pure aluminum took 6.6 msec from ignition to complete combustion. In the meantime, the aluminum powder prepared in Example 1 of the present invention took 26.6 msec from ignition to complete combustion. Therefore, it was confirmed that the aluminum powder containing a PVDF layer and an aluminum oxide layer discharged more heat as a solid fuel than the pure aluminum and was able to be burned for a longer time. The combustion test performed herein was Pressure Cell Test, in which a certain amount of the aluminum powder coated with PVDF was loaded in a sealed vessel and the aluminum powder was ignited and burned by using a heat source concentrated at the tip of tungsten. The same amount of aluminum powder was loaded in a sealed vessel as a comparative control, which was ignited and burned under the same conditions by the same manner. Then, the combustion time of these was measured. The high speed camera used herein was Photron FASTCAM SA3120K, with which moment images were measured at a frame rate of 5 kHz.

From the results of Experimental Examples 1 to 3, the section of the aluminum powder of the present invention was analyzed with a transmission electron microscope. As a result, it was confirmed that a PVDF layer was formed in the thickness of 50 to 100 nm on the aluminum core. It was also confirmed through elemental mapping that fluorine (F), the major component of PVDF, was present intensively in the PVDF layer. It was also confirmed through Fourier transform infrared spectroscopy that the same characteristic spectral peak as that of the PVDF powder was detected in the layer.

Figure 11:
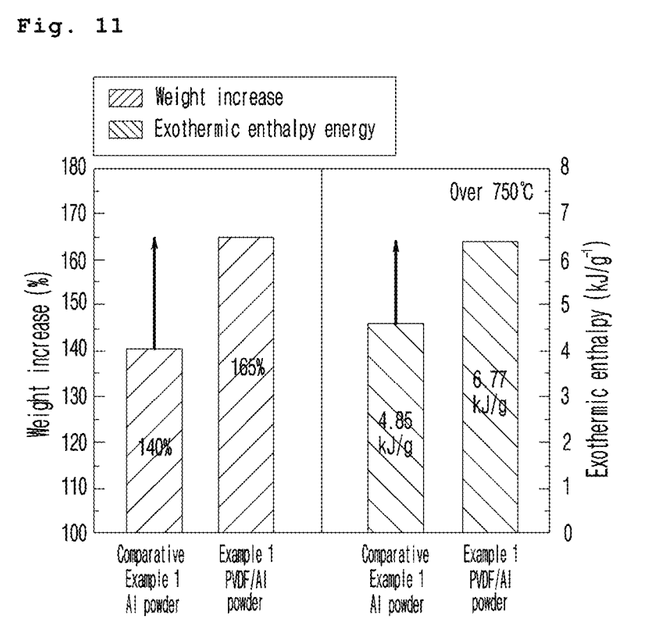
FIG. 11 is a set of graphs illustrating the combination of the results of thermogravimetric analysis spectroscopy and differential scanning calorimetry with the aluminum powders prepared in Example 1 and in Comparative Example 1 of the present invention.

The thermal properties of the aluminum powder each prepared in Example 1 and Comparative Example 1 were confirmed through the results of Experimental Examples 4 to 6. As shown in FIG. 11, it was confirmed that the aluminum powder prepared in Example demonstrated larger weight increase during the combustion process than that of the pure aluminum powder prepared in Comparative Example 1 and showed about 40% more exothermic reaction energy at the temperature range of 750° C.~1200° C. Therefore, it was confirmed that the aluminum powder of the present invention had high reactivity and high heating value at a lower temperature than pure aluminum and it was also confirmed through combustion test that the combustion performance was able to be maintained for a long time.

INDUSTRIAL APPLICABILITY

The aluminum powder coated with the fluorine-based hydrocarbon polymer layer according to the present invention and the preparation method of the same can inhibit an additional oxidation reaction of the aluminum powder by coating the surface of the powder with a fluorine-based hydrocarbon polymer layer and enable the production of the aluminum powder coated with a fluorine-based hydrocarbon polymer layer with improved fuel performance as a solid fuel.

What is claimed is:

1. An aluminum powder coated with a fluorine-based hydrocarbon polymer layer comprising an aluminum core; and a fluorine-based hydrocarbon polymer layer formed on the aluminum core, in which Al—F bonds are formed on a surface of the aluminum core by chemical reaction,
    wherein the aluminum powder coated with the fluorine-based hydrocarbon polymer layer does not include aluminum oxide or includes aluminum oxide partially at a boundary between the aluminum core and the fluorine-based hydrocarbon polymer layer.

2. The aluminum powder coated with a fluorine-based hydrocarbon polymer layer according to claim 1, wherein the aluminum core and the fluorine-based hydrocarbon polymer layer are in direct contact with each other.

3. The aluminum powder coated with a fluorine-based hydrocarbon polymer layer according to claim 1, wherein a diameter of the aluminum core is 1 μm to 10 μm.

4. The aluminum powder coated with a fluorine-based hydrocarbon polymer layer according to claim 1, wherein a thickness of the fluorine-based hydrocarbon polymer layer is 10 nm to 500 nm.

5. The aluminum powder coated with a fluorine-based hydrocarbon polymer layer according to claim 1, wherein a polymer forming the fluorine-based hydrocarbon polymer layer is polyvinylidene fluoride (PVDF).

6. An underwater bonding material comprising the aluminum powder of claim 1.

7. A diesel engine reactivity enhancing additive comprising the aluminum powder of claim 1.

8. A solid fuel comprising the aluminum powder of claim 1.

9. A powder material for the production of a three-dimensional structure comprising the aluminum powder of claim 1.

10. A highly reactive material for welding comprising the aluminum powder of claim 1.

11. A preparation method of the aluminum powder coated with a fluorine-based hydrocarbon polymer layer of claim 1, comprising the following steps:
    eliminating the oxide film on the surface of the aluminum powder by a liquid phase process (step 1);
    introducing a fluorine-based hydrocarbon polymer solution into a solution finished with step 1 above (step 2); and
    recovering the aluminum powder coated with the fluorine-based hydrocarbon polymer layer on its surface (step 3).

12. The preparation method of the aluminum powder coated with a fluorine-based hydrocarbon polymer layer according to claim 11, wherein a diameter of the aluminum powder particle of step 1 is 1 μm to 10 μm.

13. The preparation method of the aluminum powder coated with a fluorine-based hydrocarbon polymer layer according to claim 11, wherein a solution used in the liquid phase process of step 1 is one or more solutions selected from the group consisting of a hydrofluoric acid solution, a nitric acid solution, a sulfuric acid solution, a citric acid solution, a maleic acid solution, an acetic acid solution, basic sodium hydroxide, basic potassium hydroxide and an aqueous ammonia solution.

14. The preparation method of the aluminum powder coated with a fluorine-based hydrocarbon polymer layer according to claim 11, wherein the solvent used for the fluorine-based hydrocarbon polymer solution of step 2 is to inhibit the oxidation of aluminum powder.

15. The preparation method of the aluminum powder coated with a fluorine-based hydrocarbon polymer layer according to claim 11, wherein the solvent used for the fluorine-based hydrocarbon polymer solution of step 2 is one or more solvents selected from the group consisting of N,N-dimethylforanamide (DMF, $C_3H_7NO$), dimethyl sulfoxide (DMSO) and tetrahydrofuran (THF).

16. The preparation method of the aluminum powder coated with a fluorine-based hydrocarbon polymer layer according to claim 11, wherein the fluorine-based hydrocarbon polymer of step 2 is polyvinylidene fluoride (PVDF).

17. The preparation method of the aluminum powder coated with a fluorine-based hydrocarbon polymer layer according to claim 11, wherein the step 3 additionally includes a step of heat-treating before recovering the aluminum powder coated with the fluorine-based hydrocarbon polymer layer.

18. The aluminum powder coated with a fluorine-based hydrocarbon polymer layer according to claim 1, wherein one or more materials selected from the group consisting of aluminum hydroxide and aluminum fluoride are included at least partially between the aluminum core and the fluorine-based hydrocarbon polymer layer.

* * * * *